(12) United States Patent
Podkopayev

(10) Patent No.: US 7,540,218 B2
(45) Date of Patent: Jun. 2, 2009

(54) BRAKE ASSEMBLY

(75) Inventor: Vadym Podkopayev, Toronto (CA)

(73) Assignee: Intier Automotive Closures, Inc., Newmarket, Ontario (CA)

( * ) Notice: Subject to any disclaimer, the term of this patent is extended or adjusted under 35 U.S.C. 154(b) by 713 days.

(21) Appl. No.: 11/109,277

(22) Filed: Apr. 18, 2005

(65) Prior Publication Data

US 2005/0229738 A1 Oct. 20, 2005

Related U.S. Application Data

(60) Provisional application No. 60/563,530, filed on Apr. 19, 2004.

(51) Int. Cl.
*G05G 1/30* (2008.04)
(52) U.S. Cl. ............................................. 74/512
(58) Field of Classification Search ................... 74/512, 74/513, 560; 180/271, 274, 281, 315, 316
See application file for complete search history.

(56) References Cited

U.S. PATENT DOCUMENTS

| | | | | |
|---|---|---|---|---|
| 5,327,797 A | * | 7/1994 | Seifrit, Jr. .................... | 74/512 |
| 5,842,364 A | * | 12/1998 | Oliver .......................... | 70/202 |
| 6,041,674 A | | 3/2000 | Kato | |
| 6,142,036 A | | 11/2000 | Mizuma et al. | |
| 6,364,046 B1 | * | 4/2002 | Forssell et al. .............. | 180/275 |
| 6,408,711 B1 | | 6/2002 | Mizuma et al. | |
| 6,571,659 B2 | * | 6/2003 | Choi ........................... | 74/512 |
| 6,742,411 B2 | | 6/2004 | Aoki et al. | |
| 2004/0089490 A1 | * | 5/2004 | Yamanoi et al. ............. | 180/271 |
| 2005/0050980 A1 | * | 3/2005 | Park ............................ | 74/512 |
| 2006/0230870 A1 | * | 10/2006 | Fukase ........................ | 74/512 |

* cited by examiner

*Primary Examiner*—Vicky A Johnson
(74) *Attorney, Agent, or Firm*—Clark Hill PLC

(57) ABSTRACT

A brake assembly has a frame configured to mount to a vehicle. A link is pivotally mounted to the frame. A pedal is pivotally mounted to an end of the link, defining a pedal pivot point. A latch is mounted on the frame and is operable to selectively engage and disengage the link. The link is able to move selectively between an operational position and a crash position. When the link is in the operational position, the link supports the pedal and positions the pedal pivot point for normal operational movement of the pedal through a normal operating range to operate braking of the vehicle. When the link is in the crash position, the latch is released and the pedal pivot point moves to allow the pedal to move beyond the normal operating range minimizing risk of injury to the driver.

7 Claims, 1 Drawing Sheet

BRAKE ASSEMBLY

RELATED APPLICATION

This application claims priority to and all the benefits of U.S. Provisional Patent Application No. 60/563,530, filed on Apr. 19, 2004.

FIELD OF THE INVENTION

The present invention relates to a brake assembly for a vehicle. In particular, this invention relates to a brake assembly having a feature for minimizing injury to a driver during a collision.

BACKGROUND OF THE INVENTION

During a collision, the vehicle will collapse from the lower extremity first. As the vehicle crumples, the wall that separates the engine compartment and the occupant compartment will move rearwardly reducing the volume available for the driver. The brake pedal assembly is normally mounted on the fire wall and will encroach into the driver's volume. In many instances, the driver will be depressing the brake pedal at the time of collision. Thus, the brake pedal will act against the driver, increasing the risk of leg injury to the driver.

SUMMARY OF THE INVENTION

It is desirable to provide a brake assembly that has a feature that enables the brake assembly to "break-away" during a collision to minimize risk of injury, especially lower limb injuries.

According to one aspect of the invention there is provided a brake assembly that has a frame configured to be mounted to a vehicle. A link is pivotally mounted to the frame. A pedal is pivotally mounted to an end of the link, defining a pedal pivot point. A latch is mounted on the frame and is operable to selectively engage and disengage the link, enabling the link to move selectively between an operational position and a crash position. When the link is in the operational position, the link supports the pedal and positions the pedal pivot point for normal operational movement of the pedal through a normal operating range to operate braking of the vehicle. When the link is in the crash position, the latch is released and the pedal pivot point moves to allow the pedal to move beyond the normal operating range minimizing risk of injury to the driver.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Figure 1:
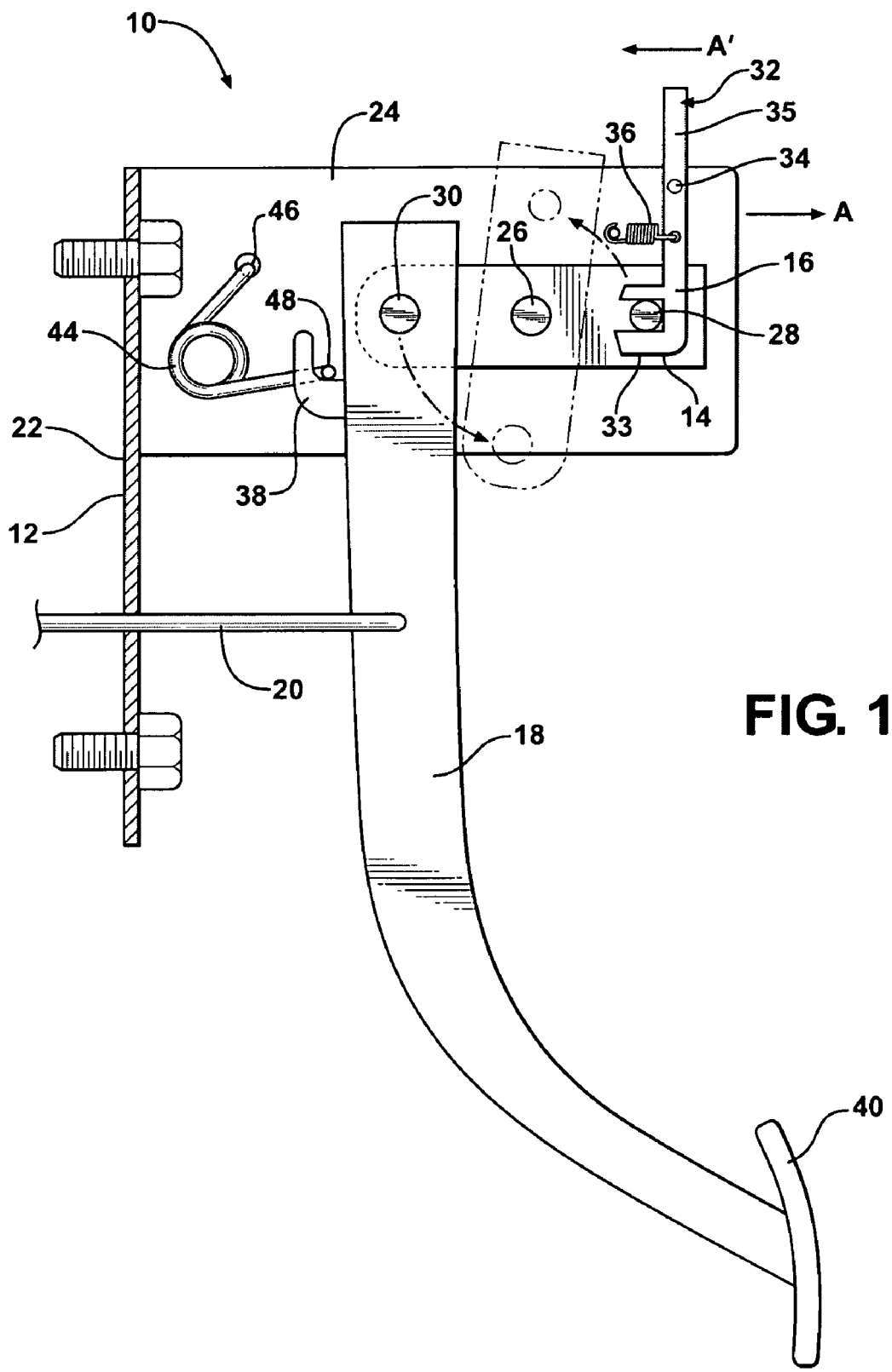
FIG. 1 shows a schematic side elevational view of a brake assembly of the present invention.

The brake assembly 10 of the present invention is generally illustrated in FIG. 1. The brake assembly 10 comprises a frame 12, a mounting link 14, a latch 16, a pedal arm 18 and a push rod 20.

Frame 12 has a base plate 22 and a pair of spaced apart mount plates 24 extending generally perpendicular to the base plate 22. For ease of reference, only one mount plate 24 is illustrated. Preferably, the frame 12 is made from stamped steel.

A first pivot pin 26 extends between mount plates 24. Mounting link 14 is pivotally mounted on first pin 26. A second pin 28 extends from link 14 on a first end region of the link 14, relative to the first pivot pin 26. A third pivot pin 30 extends from link 14 on an end region thereof opposite the second pin 28. In the preferred embodiment, link 14 has a pair of elongate side portions joined to a horizontal section defining a U-shaped cross section. Pins 28 and 30 extend from opposite side portions.

Latch 16 generally comprises a hook 32 pivotally mounted to at least one of the mount plates 24 by pin 34. Hook 32 has a hook end 33 and a distal end 35. Distal end 35 ends beyond the mount plates 24. The hook end 33 is positioned to engage pin 28 of mounting link 14. Spring 36 is optionally provided to provide a biasing force to hook 32 to maintain the hook 32 engaged with pin 28. The biasing force of spring 36 ensures that the hook 32 engages the mounting link 14 until a crash condition. Latch 16 retains the mounting link 14 in a stable normal operating condition as illustrated.

The pedal arm 18 can be depressed by the driver by pressing on the foot pad 40 through a normal operating range. The pedal arm 18 will pivot about pin 30 to move the push rod 20 forwardly to energize braking of the vehicle.

Pedal arm 18 is conventional in design and manufacture. An upper end of pedal arm 18 is pivotally mounted on pin 30 of link 14. Pedal arm 18 has a hook 38 extending forwardly of the pedal arm 18. The footpad 40 at the distal end of pedal arm 18 is rearwardly facing. At a point intermediate the ends of the pedal arm 18, push rod 20 is pivotally connected. The push rod 20 extends forwardly of the pedal arm 18 through the base plate 22 to operatively connect with the master cylinder.

Spring 44 extends between the mount plate and the hook 38 on pedal arm 18. Spring 44 provides a biasing force to return the pedal arm 18 back into a normal ready position.

The brake assembly 10 is mounted on the firewall extending between the engine compartment and the occupant compartment. During a collision, the firewall is displaced rearwardly, as indicated by arrow A, before the upper instrument panel portion. The relative motion (A-A') between the brake assembly 10 and the instrument panel, for instance, will trip the distal end 35 of the hook 32, causing the hook 32 to rotate out of engagement with the pin 28 of mounting link 14.

Once released from the latch 16, the mounting link 14 is free to rotate about pivot pin 26. Rotation of the mounting link 14 will rotate the position of the pivot pin 30 and hence the pivot point of pedal arm 18. The pedal arm 18 is now able to move beyond a normal operating range. The new free hanging pivot point of pedal arm 18 is relatively rearwardly of the base plate 22. In this free hanging position, the foot pad 40 pivots away from the driver thereby reducing the risk of leg injury.

The above described embodiments of the invention are intended to be examples of the present invention and numerous modifications, variations, and adaptations may be made to the particular embodiments of the invention without departing from the scope of the invention, which is defined in the claims.

What is claimed is:

1. A brake assembly comprising:
a frame configured to be mounted to a vehicle,
a link pivotally mounted to the frame,
a pedal pivotally mounted to said link about a pedal pivot point, and
a latch mounted on said frame and operable to selectively engage and disengage said link, enabling said link to move between an operational position and a crash position, when said link is in said operational position, said link supports said pedal and positions said pedal pivot point for normal operational movement of said pedal through a normal operating range of movement, when said link is in said crash position said pedal pivot point moves enabling said pedal to move beyond said normal operating range.

2. A brake assembly for a vehicle, said brake assembly comprising:

a frame configured to be mounted to the vehicle;

a link pivotally mounted to said frame;

a pedal pivotally mounted to said link about a pedal pivot point; and a latch pivotally mounted to said frame and operable to selectively engage and disengage said link, enabling said link to move between an operational position and a crash position, when said link is in said operational position, said link supports said pedal and positions said pedal pivot point for normal operational movement of said pedal through a normal operating range of movement, when said link is in said crash position said pedal pivot point moves enabling said pedal to move beyond said normal operating range.

3. A brake assembly as set forth in claim 2 wherein said latch extends between a hook end and a distal end, wherein said hook end is configured to engage said link.

4. A brake assembly as set forth in claim 3 including a first spring extending between said frame and said latch to bias said latch to maintain said hook end engaged with said link.

5. A brake assembly as set forth in claim 4 including a second spring extending between said frame and said pedal to bias said pedal to a normal ready position.

6. A brake assembly as set forth in claim 5 wherein said pedal includes a hook extending forwardly therefrom and said second spring extends between said frame and said hook.

7. A brake assembly for a vehicle, said brake assembly comprising:

a frame configured to be mounted to the vehicle;

a link extending between first and second ends, said link pivotally mounted to said frame between said first and second ends and including a pin at said first end;

a pedal pivotally mounted to said second end of said link about a pedal pivot point; and a latch pivotally mounted to said frame and operable to selectively engage and disengage said pin at said first end of said link, enabling said link to move between an operational position and a crash position, when said link is in said operational position, said link supports said pedal and positions said pedal pivot point for normal operational movement of said pedal through a normal operating range of movement, when said link is in said crash position said pedal pivot point moves enabling said pedal to move beyond said normal operating range.

* * * * *